(12) United States Patent
Nelson et al.

(10) Patent No.: US 11,315,408 B1
(45) Date of Patent: Apr. 26, 2022

(54) EMERGENCY COMMUNICATIONS SYSTEM

(71) Applicants: David L. Nelson, Framingham, MA (US); Richard H. Spellman, Randolph, MA (US)

(72) Inventors: David L. Nelson, Framingham, MA (US); Richard H. Spellman, Randolph, MA (US)

(73) Assignee: CAUZWAY, LLC, Framingham, MA (US)

(*) Notice: Subject to any disclaimer, the term of this patent is extended or adjusted under 35 U.S.C. 154(b) by 98 days.

(21) Appl. No.: 16/580,418

(22) Filed: Sep. 24, 2019

Related U.S. Application Data (60) Provisional application No. 62/738,794, filed on Sep. 28, 2018.

(51) Int. Cl.
| | | |
|---|---|---|
| *G08B 25/01* | (2006.01) | |
| *G08B 25/12* | (2006.01) | |
| *G08B 21/10* | (2006.01) | |
| *H04M 3/51* | (2006.01) | |
| *H04W 4/90* | (2018.01) | |
| *H04W 76/50* | (2018.01) | |
| *G07C 9/20* | (2020.01) | |

(52) U.S. Cl.
CPC .............. *G08B 25/12* (2013.01); *G07C 9/20* (2020.01); *G08B 21/10* (2013.01); *G08B 25/016* (2013.01); *H04M 3/5116* (2013.01); *H04W 4/90* (2018.02); *H04W 76/50* (2018.02)

(58) Field of Classification Search
CPC ...... G08B 25/12; G08B 21/10; G08B 25/016; H04W 4/90; H04W 76/50; G07C 9/20; H04M 3/5116
See application file for complete search history.

(56) References Cited

U.S. PATENT DOCUMENTS

| | | | |
|---|---|---|---|
| 7,059,520 B1* | 6/2006 | Shtesl ................ | G06Q 20/341 235/449 |
| 7,362,852 B1* | 4/2008 | Rodkey ................ | G06Q 10/10 379/252 |
| 8,890,685 B1* | 11/2014 | Sookman ............. | G08B 25/008 340/539.13 |
| 9,092,708 B1* | 7/2015 | Narendra ........... | G06K 19/0727 |
| 2004/0001498 A1* | 1/2004 | Chen .................. | H04L 12/1859 370/392 |
| 2004/0122906 A1* | 6/2004 | Goodman ........... | H04L 67/2876 709/206 |
| 2005/0143099 A1* | 6/2005 | Piccioni ................ | G08B 25/08 455/456.5 |

(Continued)

*Primary Examiner* — Nay Tun
(74) *Attorney, Agent, or Firm* — D'Ambrosio & Menon, PLLC; Usha Menon (57) ABSTRACT

According to an embodiment, an emergency communication (EC) system includes an emergency notification application for generating and receiving one or more emergency notification messages; a Websocket server for connecting one or more computing devices configured with the emergency notification application; a cloud-based storage server, wherein the storage server is configured for storing a plurality of rules for determining one or more actions to be taken in an emergency; and one or more communication channel identifiers for distributing the emergency notification messages to the one or more computing devices.

13 Claims, 5 Drawing Sheets

(56) References Cited

U.S. PATENT DOCUMENTS

| | | | |
|---|---|---|---|
| 2005/0208941 A1* | 9/2005 | Ordille | H04L 12/18 455/435.1 |
| 2008/0039008 A1* | 2/2008 | Chen | H04W 4/06 455/3.01 |
| 2008/0270538 A1* | 10/2008 | Garg | G06Q 30/04 709/204 |
| 2009/0187570 A1* | 7/2009 | Postlethwaite | G06F 16/90344 |
| 2010/0267361 A1* | 10/2010 | Sullivan | H04W 4/02 455/404.2 |
| 2014/0136589 A1* | 5/2014 | Wahler | H04L 63/0263 709/201 |
| 2014/0239065 A1* | 8/2014 | Zhou | G06Q 20/40145 235/380 |
| 2014/0244765 A1* | 8/2014 | Smith | H04L 51/046 709/206 |
| 2015/0172228 A1* | 6/2015 | Zalepa | H04L 12/1813 709/206 |
| 2015/0199903 A1* | 7/2015 | Cuomo | H04W 4/21 340/905 |
| 2015/0207857 A1* | 7/2015 | Horton | H04L 67/16 709/204 |
| 2015/0244121 A1* | 8/2015 | Amelio | G06Q 10/063 439/345 |
| 2017/0147687 A1* | 5/2017 | Perun | G06F 16/35 |
| 2017/0171873 A1* | 6/2017 | Shaw | H04L 51/26 |
| 2017/0222919 A1* | 8/2017 | Kawazoe | H04L 45/44 |
| 2017/0251026 A1* | 8/2017 | Straub | H04L 67/2842 |
| 2018/0167475 A1* | 6/2018 | Agarwal | H04L 63/101 |
| 2018/0343217 A1* | 11/2018 | Sedan | H04L 65/4084 |
| 2020/0015058 A1* | 1/2020 | Wu | H04L 67/306 |

* cited by examiner

EMERGENCY COMMUNICATIONS SYSTEM

CROSS-REFERENCE TO RELATED APPLICATION

This application claims the benefit of Provisional U.S. Patent Application No. 62/738,794, filed Sep. 28, 2018, entitled "Emergency Communications System", the entire content and disclosure of which, both express and implied, is incorporated herein by reference.

BACKGROUND

Mass shooting incidents are on the rise in public venues such as, theaters, concerts and shopping centers. The number of schools, in particular, that have experienced a fatal shooting incident has tragically increased. In such emergency situations, it is imperative for real-time communication among law enforcement personnel, medical personnel and other first responders and the citizens under duress. The first few moments of a life-threatening or otherwise emergency situation are critical to minimize casualties. Real-time and accurate communication of the nature of the crisis/emergency is critical in order to provide a timely and effective response.

Historically, emergency communication relied on telephones and two-way radio transmission. For instance, emergency notifications were provided using the 911 facility over the telephone network. These calls are typically received by dispatchers who in turn summoned first responder resources, all done using human voice communication. Technically, these communication mechanisms occurred in real-time. However, these methods involve numerous problems associated with inaccurate and incomplete information, delays in acquiring and assessing relevancy of information, and general confusion of human communication under the stress of an emergency. For example, a school principal may not be able to provide accurate information regarding the nature and location of an active shooter or shooters in real-time. All of these problems contribute to a time delay in responding to the emergency situation. A delayed response can result in increasing the seriousness of the emergency or casualties involved.

There is reason to expect that an all-digital network approach might be preferred given that the messages can contain significantly more relevant information and provide real-time interaction. For example, a growing number of cell phone applications have been developed to facilitate emergency communication. However, these applications have met with mixed success due to their use of standard techniques. For example, remote notifications in Apple iPhones® uses a facility to communicate to nearly a billion cell phones world-wide as opposed to targeted notifications to emergency management personnel. Additionally, these are not geared towards notifying police officers in patrol cars who, for various reasons, are not receptive to cell phone calls.

Other conventional alert mechanisms use Internet applications. Most Internet applications have historically involved a browser connected to a server. This provides incredibly large scalability at the server since each browser request, using HTTP, is an independent transaction with no data retained at the server. Any data that is desired to persist beyond that transaction is stored in cookies—which are located on the client—and managed by the browser. More recently, website applications have involved sockets which provide two-way full duplex communication with a connected browser. However, these applications involve a single user connected to a very powerful global website.

In an emergency involving an active shooter in a confined location (for example, a school), there is a need for a distributed application across a defined area—which could be a potentially large area—such as, the immediate neighborhood or facility experiencing the emergency. However, historically, connecting various buildings involves unique issues. This requires managing Internet URLs that can penetrate on-premises firewalls to allow systems in one building to connect to another. There are numerous serious problems with this technique involving opening firewall ports, changing URLs, and the general management of a complicated system.

Accordingly, there is a need for instantaneous location determination and alert mechanisms to provide timely assistance and intervention in emergency situations. To avoid any delays in responding to the emergency, the components of the emergency communication system should not involve browsers or website servers, but should involve various components located within various facilities (for example, buildings) located in the defined area which can all be coordinated around a single application.

SUMMARY

The present invention relates to systems and methods for immediately alerting pre-designated personnel within a specific community, including local/community law enforcement personnel, of an emergency situation at a facility in the community. According to an embodiment, an emergency communication (EC) system includes an emergency notification application for generating and receiving one or more emergency notification messages; a Websocket server for connecting one or more computing devices configured with the emergency notification application; a cloud-based storage server, wherein the storage server is configured for storing a plurality of rules for determining one or more actions to be taken in an emergency; and one or more communication channel identifiers for distributing the emergency notification messages to the one or more computing devices. According to an embodiment, the EC system includes an on-premise logic server, wherein the on-premise logic server is configured to directly connect to one or more local facilities using a mesh network.

According to another embodiment, the EC system includes one or more on-premise adapters, wherein the on-premise adapters are configured to activate one or more on-site third-party emergency communication systems or devices. The activation of the one or more on-site emergency communication devices triggers an opening and closing of a relay to activate a door lock at an emergency site.

The EC system utilizes a publish-subscribe model for controlling the distribution of the emergency notification messages. The emergency notification application is configured to present a user with one or more interfaces having a plurality of graphical buttons, wherein each button is pre-configured to trigger a response to the emergency. Upon the condition that a user subscribes to a communication channel "123", the user receives an emergency notification message published to any of "1", "12" and "123" communication channels.

In an embodiment, each school in a community is assigned an unique communication channel to communicate an emergency to law enforcement personnel in the community. The law enforcement personnel are provided access to communication channels from all schools in the community.

When a school teacher in a school activates the emergency notification application, information that is associated with the school teacher is communicated to the law enforcement personnel. The associated information can include, without limitation, the name of the teacher, the name of the school and geographical coordinates associated with the school.

In one embodiment, the computing device comprises an interactive wearable device. The device comprises a button pad configured to be activated by the wearer of the device in an emergency. Activating the button pad communicates an alert to a first responder.

According to another embodiment, a method for providing a coordinated response to an emergency notification involves: providing an emergency notification application, wherein the application is configured to be installed on a computing device; and establishing a communication channel with local law enforcement for each authorized user of the application. When an emergency occurs, emergency notification application instantaneously transmits a notification message through the established communication channel to alert the law enforcement. The notification application is configured to provide a law enforcement personnel immediate information on an exact location of the emergency such that they can respond to the emergency without any delay.

BRIEF DESCRIPTION OF THE DRAWINGS

The appended figures depict certain non-limiting embodiments of an interactive wearable device for communicating an alert to a public safety personnel. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

DETAILED DESCRIPTION

The embodiments of the invention relate to a communication system for coordinating a response to an emergency. The emergency communication system described herein utilizes an all-digital information system and facilitates delivery of the information in substantially real-time. As used herein, the term "real-time" means there is no significant measurable delay in the delivery of information. Real-time information can be provided to emergency management user community in specific location. The emergency management user community can include security personnel, police departments, mobile patrol cars, fire departments, EMS and other similar personnel. The current 911 communication system can be replaced with the all-digital information emergency communication system of the present invention to provide a coordinated and timely response to an emergency.

Figure 1:
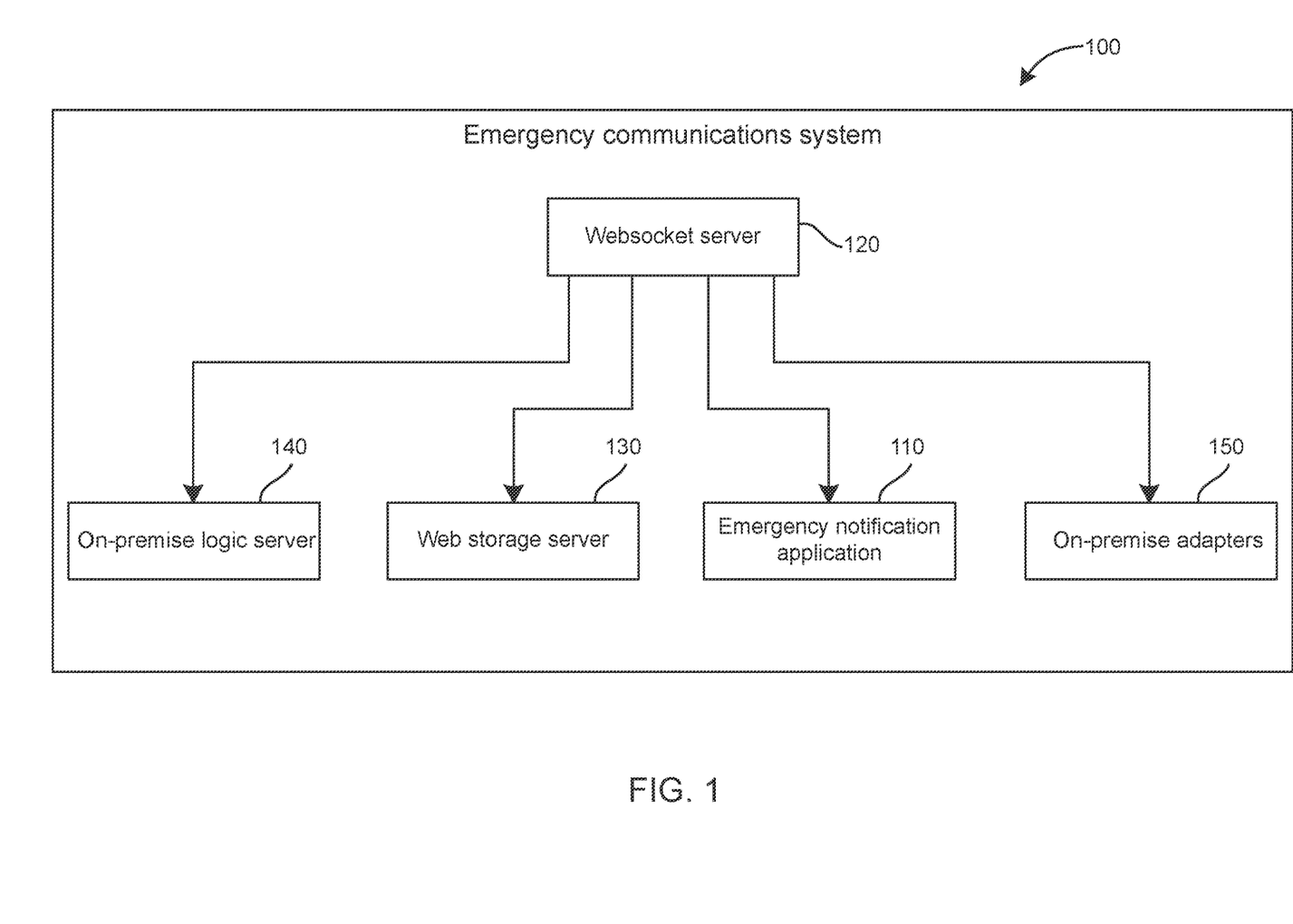
FIG. 1 illustrates a schematic view of the EC system according to an embodiment.

An embodiment of the emergency communication ("EC") system 100 is shown in FIG. 1. The EC system 100 can be configured to be activated only in a specific, pre-defined locality, such as a city, county, community or a school district. The EC system 100 does not rely on a generic computing platform serving a large number of users and applications. Instead, the EC system 100 is configured to deliver accurate emergency notifications, including the accurate location of the emergency, in real-time to local first responders thereby enabling them to respond to the emergency in a timely and effective manner.

The EC system 100 includes: an emergency notification application 110; a dedicated Websocket server 120; and a web storage server 130. The EC system 100 can further include software-based communication channel identifiers for directing messages to appropriate systems. The EC system 100 uses a publish-subscribe model to control distribution of the emergency notification messages. The EC system 100 can also optionally include an on-premise logic server 140. The EC system 100 system can additionally include one or more on-premise adapters 150. Central to the entire operation is the cloud-based/Websocket server 120. All other components, 110, 130, 140, 150 establish an active bidirectional connection to the Websocket server 120. The storage server also called the logic server 130 is configured to receive messages from other components (relayed through the Websocket server 120). It can further apply rules to determine suitable activities or responses to an emergency notification, and send messages out to other components (again, relayed through the Websocket server 120). The emergency notification application clients 110 are installed on user computing devices. Each of the devices can maintain a Websocket connection to send alarm messages/emergency notification messages to the logic server 130, and to receive messages from the logic server 130. The on-premise adapters can connect to display systems, audio system, and mechanical relays to control on-premise facilities. Finally, standard Internet browsers can be used connect to a server which displays icons and other information, live and in real-time. Additional status and control can be available using standard browsers.

The emergency notification application 110 is configured to generate and receive one or more emergency notification messages. The emergency notification application 110 can be distributed among various client computing devices. A user (such as, a school teacher in a particular school) experiencing an emergency can interact with an interface that is provided by the emergency notification application 110. The emergency notification application 110 can be configured to run on any computing device or a device having computer functionality, such as a smart-phone, a tablet, a personal digital assistant (PDA), a mobile telephone, a laptop computer, a wearable device, or any computing appliance. The emergency notification application 110 can be conveniently invoked by clicking an icon displayed on the computing device.

Figure 2:
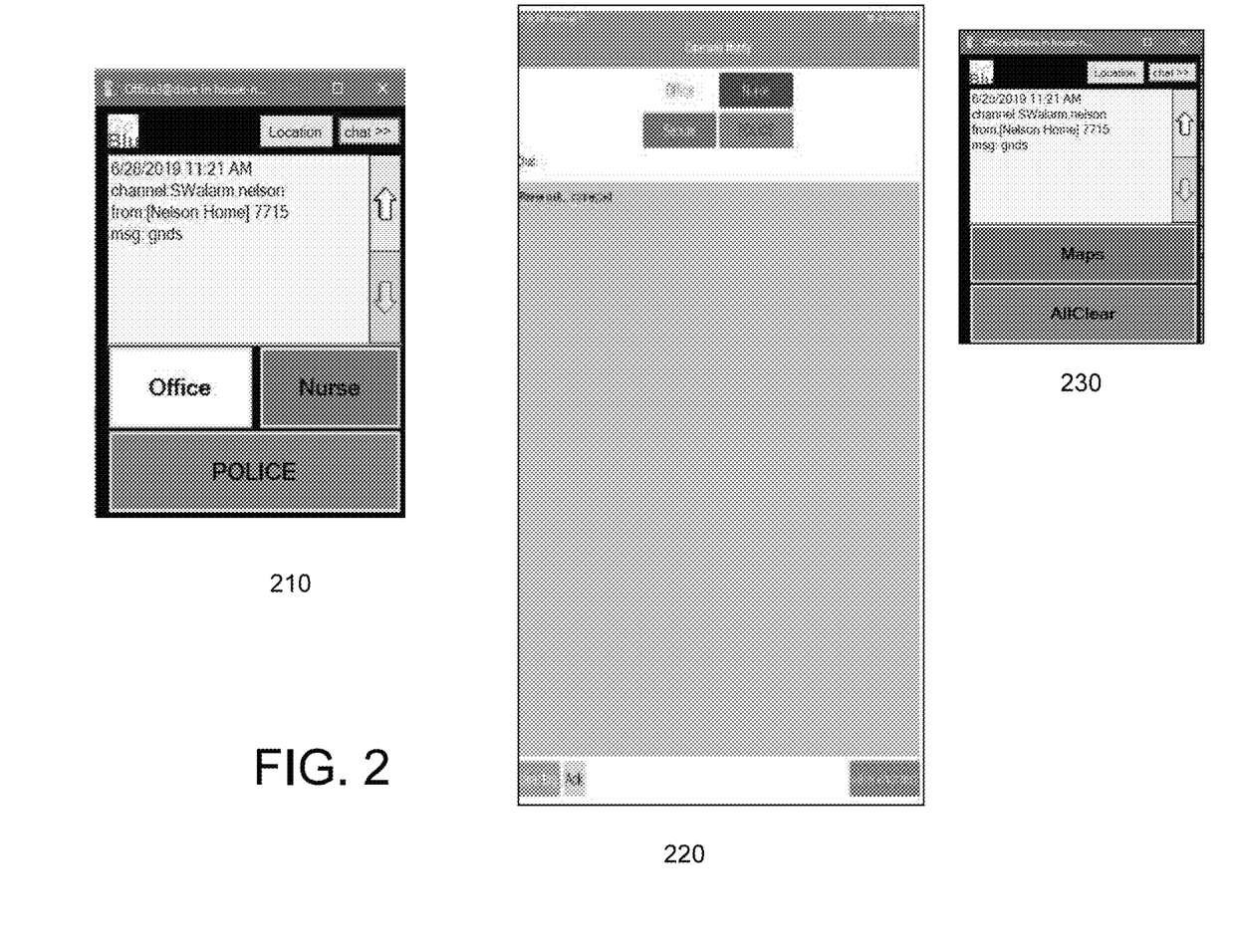
FIG. 2 illustrates various views of user interfaces of an emergency notification application according to an embodiment.

As shown in FIG. 2, invoking the emergency notification application 110 presents the user with one or more interfaces having a plurality of graphical control elements, such as, command or push buttons. Each button can be pre-configured to trigger a designated functional event, such as, requesting help from the school office, requesting medical assistance, or calling for police or other law enforcement assistance, by clicking or pushing on it. The buttons can be conveniently labelled with descriptive words or phrases like "Office", "Nurse" and "Police".

Various exemplary interfaces 210, 220, 230 are illustrated in FIG. 2. Interface 210 may be presented to a school teacher who accesses the EC system 100 on a laptop computer running, for example, Windows®. Interface 220 depicts the interface presented to teacher who accesses the EC system 100 on a mobile phone. Interface 230 illustrates the interface presented to a police dispatcher. It should be understood that the interfaces 210, 220, 230 are merely exemplary in nature. The EC system 100 can be configured such that additional or fewer buttons can be displayed depending on user requirements.

The EC system 100 involves two cloud-based services. The first is the Websocket server 120 that interconnects the client computing devices configured with the emergency notification application 110. This eliminates the need for URLs or for opening firewall ports which could be time consuming in an emergency. Websocket server 120 is provided to facilitate minimal delays in communication during an emergency. The second is a cloud-based storage server 130 which serves as a repository or rules engine for storing a plurality of rules for determining the actions to be taken in an emergency. In an embodiment, a single cloud-based socket server 120 can accept and relay all notification messages throughout this system 100 without perceptible delays. Communication among the clients configured with the emergency notification application 110 via Websocket 120 has beneficial performance implications, including, response times measured in milliseconds. As an example, an emergency notification message transmitted by a school teacher can be received in a police patrol car without any perceptible delay. Furthermore, subsequent chat messages between the teacher and the police dispatcher can also be received without delays.

The on-premise logic server 140 can be located within one or more facilities in the local community. For instance, the on-premise logic server 140 an be located at one or more schools in the community. The on-premise logic server 140 can be configured to directly connect to other local facilities using a mesh network supporting portable wireless transmitters, two-way radio systems, school audio paging systems, and more. Their activities can be controlled by rules stored within the on-premise logic server 140.

The one or more on-premise adapters 150 can also be located within one or more facilities in the local community, such as, one or more schools in the community. The on-premise adapters 150 can be third party security systems/devices (such as, a video camera security system, a system of door/window locks, PA system with speakers, and similar devices). The on-premise adapter 150 can be configured to directly connect to large displays, two-way radio systems, school audio paging systems, and more. The activity of these systems/devices can be controlled by rules stored in the cloud-based webserver 120. The rules can govern the opening and closing of a relay to activate a door lock, a PA system with speakers, etc. of the systems/devices, and other such activities.

The EC system 100 can utilize a modified version of the conventional publish-subscribe model/system for transmission of emergency notifications. The conventional publish-subscribe model is considerably more efficient than other emergency notification models. An emergency message on a publish-subscribe model can be broadcasted to a large number of remote systems by sending a single message, rather than having to send out separate messages to each recipient. The Websocket server 120 can duplicate the single message in the cloud environment with greater efficiency and performance.

Each emergency notification message can include two character strings that control the transmission: (1) a "publish" string, and (2) a "channel" string. The "publish" string is used by the Websocket server 120, whereas the "channel" string is used by connection endpoints where the messages are processed. In the Websocket server, this notification message is forwarded to all connections (or connected computing devices) based on a comparison of the "publish" string and the connection's "subscribe" string which can be established when the connection is established. Consequently, the computing device can only receive emergency notification messages 'published' to the value that it 'subscribed' to. Furthermore, each computing device can have a list of 'channels' that it can process, and the transmitted emergency notification message must specify a matching channel in order for the emergency notification message to be processed. While a user/sender may publish an emergency notification message to a string that many computing devices subscribe to, it is noted that the message can be processed on a channel on which only a subset of the computing devices is actively listening. Generally, the channel text of both the message and the endpoint is a comma delimited set of individual channels and the message will be processed if only one of the channels in the message matches one of the channels at the endpoint.

If the "publish" string is included in the "subscribe" string of the connection, the message is forwarded to the connection. For example, if the subscribe string of a connection is '123456', publish to strings: '123' and '123456' are both forwarded to the connection, while a publish to string: '123456xxx' is blocked. Consequently, all the computing devices can structure their subscription by appending further character strings preventing transmissions to irrelevant endpoints, thereby reducing outbound traffic from the Websocket server 120.

Normally, a publish-subscribe system forwards a published message to all connections that match their subscription. For example, if a connection subscribes to "123", it will only receive publications intended for "123". That is, the subscription must have to precisely match the publication. However, as described earlier, in the EC system 100, if a user subscribes to channel "123", it can receive messages published to any of "1", "12" and "123" channels. In the same manner, if two users subscribe to 'abc' and 'abx' channels respectively, publications to 'a' or 'ab' will be received by both, however, a publication to 'abc' will only be received by the first user while the second user will only receive a publication to 'abx'. This technique effectively moves the channel filtering from the conventional connection endpoints to the Websocket server 120 and can also dramatically reduce network traffic.

In one embodiment, each school in a community or school district is pre-assigned a unique communication channel. This ensures that an alarm generated from or within that school will appear only on all other computing devices within the school, but will not appear in any of the other schools in the community. The police (dispatcher and patrol cars) and other first responders, however, can be given access to all channels, thereby permitting them to see emergencies from any school. In certain embodiments, the channels can be created dynamically by senders and receivers.

In an embodiment, a school teacher/user is provided access to a specific communication channel (and, if needed, more than one communication channels) for each type of emergency notification (such as, police, nurse, office). When the teacher activates the designated communication channel(s), information that is associated with the user is retrieved from the database 130. The associated information can include the name of the teacher, a map and other coordinates associated with the teacher's school, the classroom/office/room assigned to the teacher. The associated information can be previously stored in the database 130.

Each emergency can by processed by the set of rules stored in a "rules" engine. The rules engine is stored in a cloud-based storage server 130. For instance, if the buttons labelled "Office" and "Nurse" are pressed (in the interface shown in 210), a notification message can be transmitted to the school office and school nurse (or other designated medical personnel). However, in this scenario, no notification will be transmitted to the police. On the other hand, if the "Police" button is also pressed, it will cause an emergency notification message to be transmitted to the police as well.

All of the above can utilize either the school's WiFi network or a proprietary wireless 2-way network infrastructure.

Figure 3A:
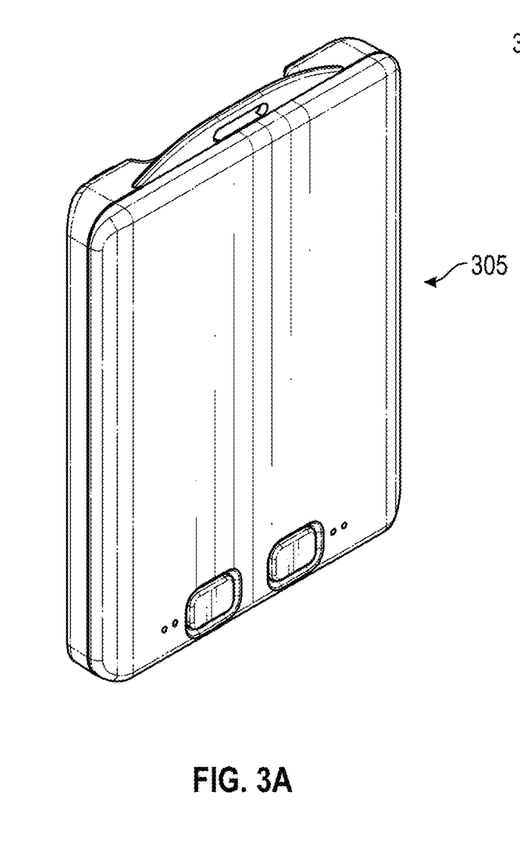
FIG. 3 illustrates front and rear views of an interactive wearable device according to an embodiment.
Figure 3B:
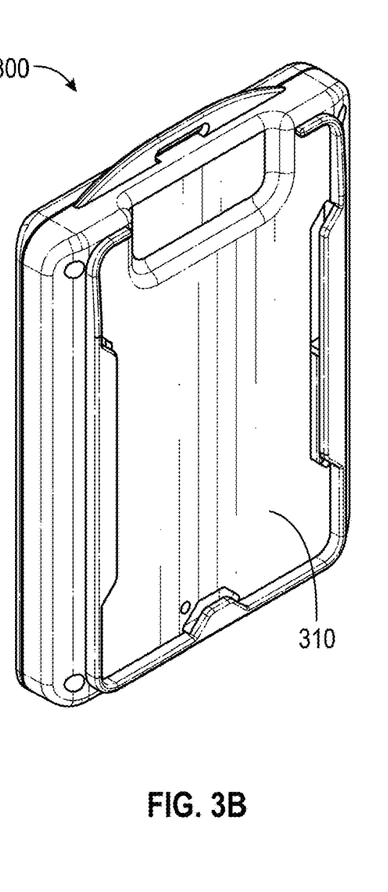
Figure 3C:
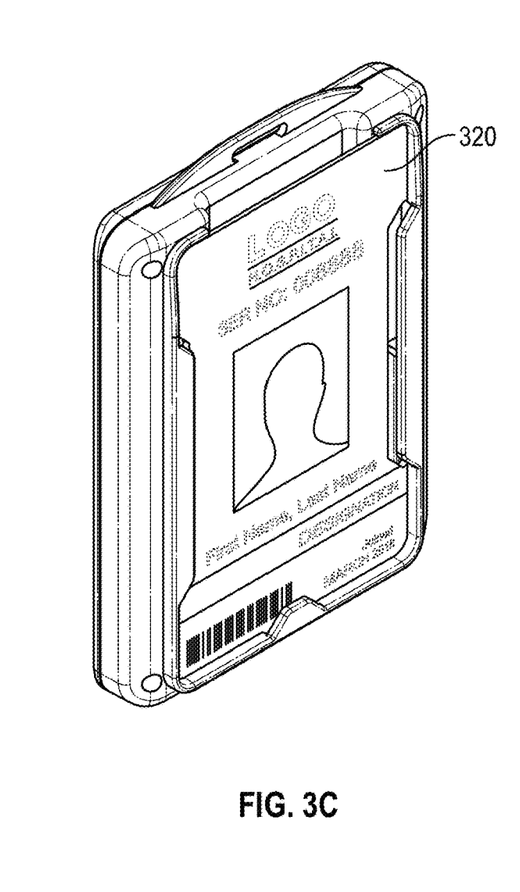

In one embodiment, as shown in FIGS. 3A-3C, the computing device can also include a specially configured portable interactive wearable device ("device") 300. Various views of the device 300 have been illustrated in FIGS. 3A-3C. The device 300 includes a case 305. As shown, one side of the case 305, for example, the back side, can include a slot 310 for receiving an employee/user identification badge 320. In an embodiment, the case 305 can be configured to have beveled ends.

Figure 4:
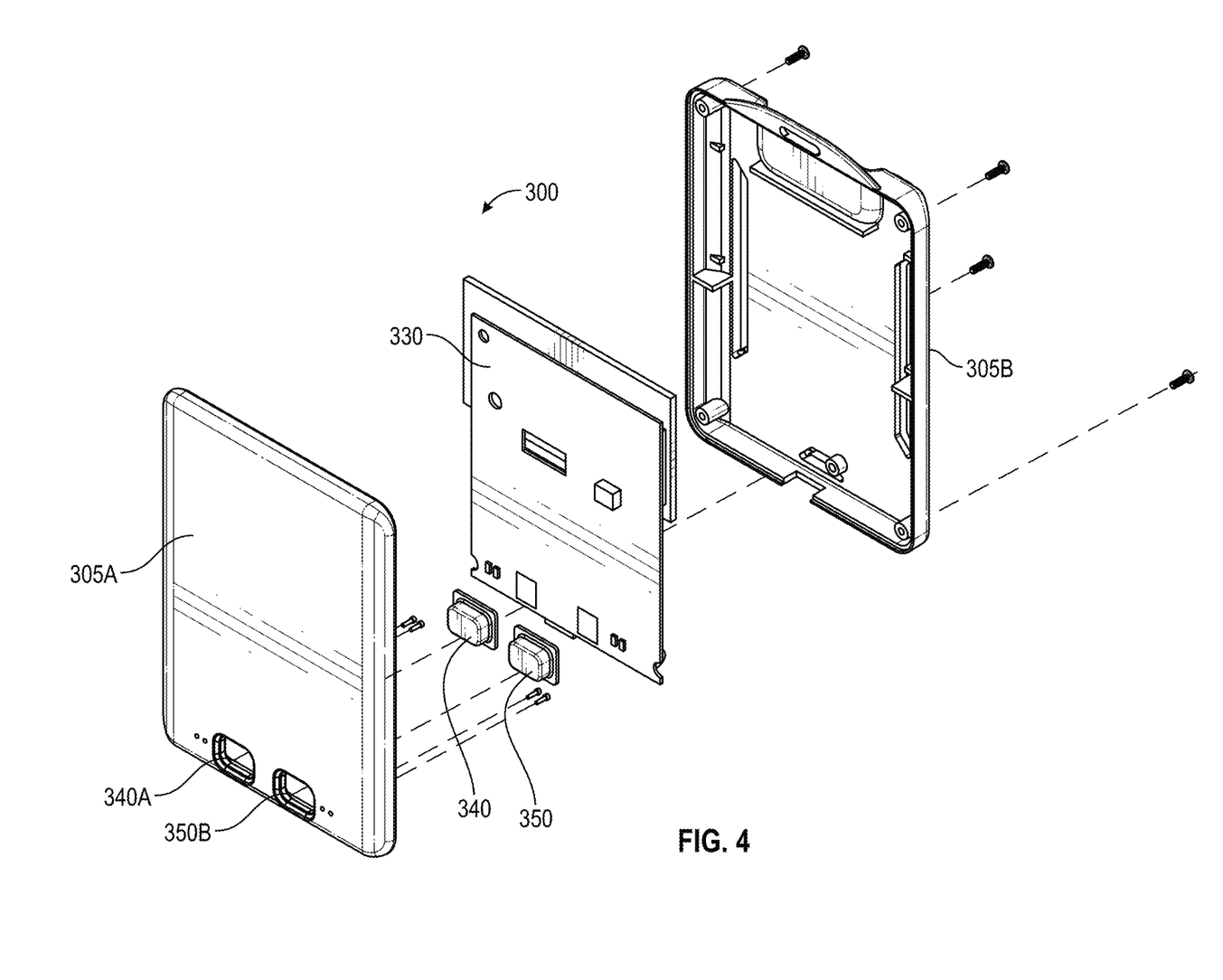
FIG. 4 illustrates the components of the interactive wearable device shown in FIG. 3.

Now referring to FIG. 4, the device 300 can include a Printed Circuit Board Assembly (PCBA) 330. The PCBA 330 includes a circuit board that electrically connects electronic components using conductive traces, pads, and other features that can be, for example, etched from copper foil laminated onto a non-conductive substrate. At least a portion of the PCBA 330 is enclosed within the case 305 formed by joining a front housing 305A and a back housing 305B. The two halves can be made of plastic or another suitable material. In an embodiment, at least a portion of the PCBA 330 is not enclosed within the case. The PCBA 330 can include at least one button pad 340 and a LED light 350. The button pad 340 is configured to protrude through an opening 340A formed on the front housing 305A. Similarly, the light 350 is configured to protrude through an opening 350A formed on the front housing 305A. The button pad 340 is configured to be activated by the wearer of the device 300 in an emergency. For example, when the button 340 is depressed, an emergency notification message is sent to a first responder using an assigned channel (as described previously). In an embodiment, when the button is pressed, the LED light 350 is configured to be triggered on. This can provide a visual warning to others in the vicinity of an emergency.

A portion of the PCBA board can also include a charging port for the device 300. The charging port may be a USB charging port. In an implementation, the charging port may be configured to extend beyond an edge of the PCBA 330.

Figure 5:
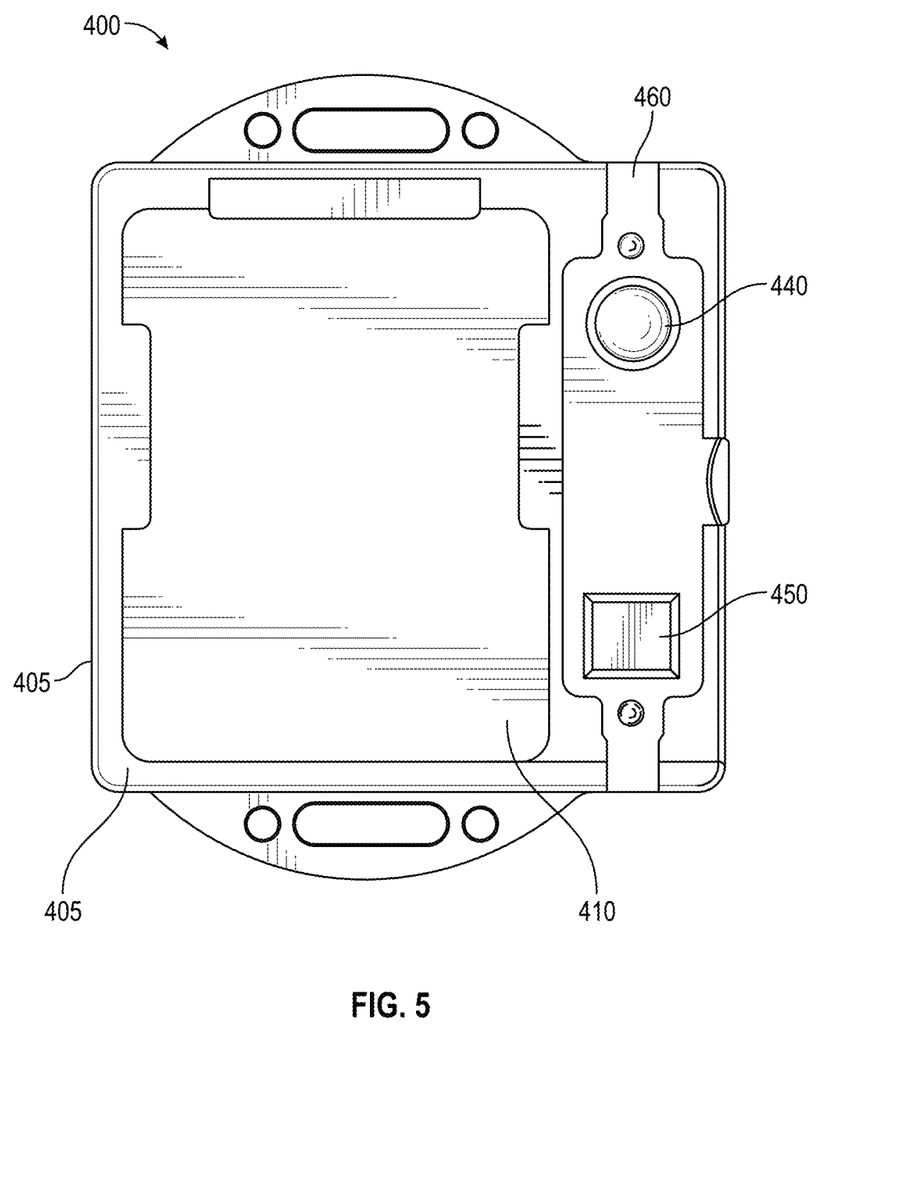
FIG. 5 illustrates yet another configuration of the interactive wearable device according to an embodiment.

FIG. 5 illustrates yet another embodiment of the interactive wearable device 400. As shown, the device includes a plastic case 405 encasing a PCBA. The device 400 includes a mounted button 440 and LED light 450 mounted on a front housing 405A. This configuration further includes a detachable battery well 460. The battery well is configured to receive one or more suitably sized batteries. The front housing 405A also includes a slot 410 for receiving an employee/user badge. The button 440 is configured to be activated by the wearer of the device 400 in an emergency. When the button 440 is pressed, an alert is communicated to pre-designated personnel, including first responders, about an emergency situation in real-time. The location information of the emergency situation is also communicated to the pre-designated personnel. The location information can include a building name, building address, username (associated with the wearer of the interactive wearable device), a room number or identifiable area and a date and time stamp. In an embodiment, when the button is pressed, the LED light 450 is configured to be triggered on. This can provide a visual warning to others in the vicinity of an emergency.

According to an embodiment, a method for providing a coordinated response to an emergency notification is disclosed. The method involves providing a facility (such as, a school) an embodiment of the emergency notification application disclosed herein. The application can be installed on any designated computing device, including a portable wearable device described herein, a computer or a mobile phone. The application can be then registered with the cloud-based Websocket server, cloud-based storage server, on-premise adapter, on-premise logic servers, local police, medical authorities and other law enforcement personnel. Communication channels can be established for each authorized user of the application, the school nurse, school administration office and local first responders, including, police, fire, medical and other emergency responders. Pertinent information on the facility, the computing device and all authorized users (such as, school teachers, school nurses) at the facility and the communication channels is input into the cloud-storage database.

When an authorized user reports to work, she/he can start the application. In an embodiment, the user can start the application by merely turning on their computing device. This can open a channel to the logic server stored in the cloud-storage database and at least one emergency notification icon appears on the user interface of the computing device. By clicking on the icon, the user may pull up an interface with buttons configured with a designated functionality (such as, for requesting assistance from police, school office or medical assistance). When an emergency occurs, the user can click on a particular button to send an emergency notification through the assigned channels to alert specific personnel. The emergency notification will be associated with relevant information, including the office identifier, a map of the premises, and the authorized user of the application.

Separate and multiple channels can be created for each authorized user with each emergency personnel or first responder. Patrol cars typically have mobile computing devices. When an officer starts their shift, they will turn on the patrol car computer. These computers will have a communication channel that is directly connected to the user and registered notification site (such as, the school). When a teacher activates an alert for the police (for instance, by pressing or clicking a button labelled "Police"), a real-time emergency notification message is transmitted to a computing device of a local police dispatcher and opens an audio/audio-video channel with the dispatcher. At the same time, an immediate alert goes to each patrol car within the vicinity of the school. An interactive interface can be displayed on the computing device. The interface can be configured to display integrated maps, floor plans and emergency plans of the location from which the emergency alert is received. The interface can also facilitate navigation using floor plans to the "hot zone" or location of the emergency alert. This is designed so that pre-designated personnel can visualize the best tactical approach to the emergency location. The patrol cars can immediately head to the school and receive more details from the dispatcher over the time that they are driving to the school.

The notification message is configured to transmit relevant information, such as, the school name and address, so that the police can know immediately where the emergency is located. The patrol cars can immediately head to the school and receive more details from the dispatcher when they are driving to the school. The teacher can also have a channel opened to a school nurse if they press or click on and activate the "Nurse" button.

In one embodiment, when the "Police" button is pressed, the teacher may be asked to confirm the request. For instance, the dispatcher may send a text message or a code to the teacher asking them to verify if they intended to activate the emergency notification. Once the request is confirmed, an audible alarm can be transmitted to all patrol cars as well as the police dispatcher. The audible alarm ensures that the police personnel are immediately alerted to the emergency.

Simultaneously, the application can also launch a chat application. The chat application establishes a real-time chat session between the police dispatcher, police patrol cars, and the teacher(s) within the school. The chat session allows these parties to assess and qualify the emergency.

The notification message can also be displayed on other computing devices at the location on a 'need to know' basis, such as, in other classrooms of the particular school.

In another embodiment, the user can also notify the police by activating a portable interactive wireless computing device (as described herein) located within the classroom or in the school building. Any alert from that device will send similar information as sent from a laptop computer or other user assigned computing device.

The EC system is configured to automate split-second decisions based on school policies. It can expedite alerts and improve communications in an emergency. When faced with the emergency situation, the EC system is configured to implement emergency lock down-protocols on site and initiate and expedite the response of emergency personnel such as law enforcement, fire, and medical response teams.

The components of the EC system can be pre-installed at selected facilities and vehicles in the local community. For example, the components can be installed at police departments, mobile police cars, schools, museums, etc. in the community. These components are then configured to communicate through the cloud-based socket server which receives and selectively forwards the emergency notification messages.

In certain embodiments, the EC system can be configured to issue a lockdown/lockout to all entry/access doors to the school building. It can also be configured to manage and deliver real-time instructions and messages using existing overhead paging, telephone and intercom systems in the school building. Further, the EC system can be configured to attach to existing or new displays to operate both audio and visual instructions and messages in any emergency situation.

The EC system automates the processes required to alert authorities in the event of an active shooter in less than 1 second. This eliminates the need for human action—which can be significantly impaired in an emergency situation. The processes can include, locking of controlled doors, automated PA/intercom announcements, control of alert devices, and more. Thus, the EC system is configured to address the issues with conventional technologies. The EC system can be used in schools, hospitals, chemical plants, nuclear power plants or wherever any emergency is likely to occur. The emergency can be an active shooter, an explosion, a fire, a terrorist attack and another similar situation.

Unless specifically defined herein, all technical and scientific terms used have the same meaning as commonly understood by one of ordinary skill in the art to which this invention belongs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The foregoing has outlined rather broadly several aspects of the present invention in order that the detailed description of the invention that follows may be better understood. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

What is claimed is:

1. An emergency communication (EC) system, comprising:
    an emergency notification application for generating and receiving one or more emergency notification messages;
    a WebSocket server for connecting one or more computing devices configured with the emergency notification application;
    a cloud-based storage server, wherein the storage server is configured for storing a plurality of rules for determining one or more actions to be taken in an emergency;
    one or more communication channel identifiers for distributing the one or more emergency notification messages to the one or more computing devices; and
    a modified publish-subscribe model for controlling the distribution of the one or more emergency notification messages, wherein upon the condition that a user subscribes to a communication channel "123", the user receives an emergency notification message published to "1", "12" and "123" communication channels.

2. The EC system according to claim 1, wherein the emergency notification application is configured to present a user with one or more interfaces having a plurality of graphical buttons, wherein each button is pre-configured to trigger a response to the emergency.

3. The EC system according to claim 2, further comprising an on-premise logic server, wherein the on-premise logic server is configured to directly connect to one or more local facilities using a mesh network, and wherein the on-premise logic server is configured to receive the one or more emergency notification messages when the user triggers a response to the emergency.

4. The EC system according to claim 1, further comprising one or more on-premise adapters, wherein the on-premise adapters are configured to activate one or more on-site emergency communication devices.

5. The EC system according to claim 4, wherein the activation of the one or more on-site emergency communication devices triggers an opening and closing of a relay to activate a door lock at an emergency site.

6. The EC system according to claim 1, wherein each school in a community is assigned a unique communication channel to communicate an emergency to law enforcement personnel in the community, and wherein the law enforcement personnel are provided access to communication channels from all schools in the community.

7. The EC system according to claim 6, wherein when a school teacher in a school activates the emergency notification application, information that is associated with the school teacher is communicated to the law enforcement personnel.

8. The EC system according to claim 7, wherein the associated information comprises: the name of the teacher, the name of the school and geographical coordinates associated with the school.

9. The EC system according to claim 1, wherein one or more computing devices comprises an interactive wearable device, wherein the interactive wearable device includes a slot on the device's side for receiving an employee/user identification badge.

10. The EC system according to claim 9, wherein the device comprises a button pad configured to be activated by a wearer of the device in an emergency.

11. The EC system according to claim 10, wherein activating the button pad communicates an alert to a first responder.

12. A method for providing a coordinated response to an emergency notification, comprising the steps of:

providing an emergency notification application, wherein the application is configured to be installed on a computing device;

establishing a communication channel with local law enforcement for each authorized user of the application;

generating and instantaneously transmitting one or more emergency notification messages with a publish-subscribe model, wherein the message is sent from an authorized user of the application to local law enforcement; and directing the emergency notification message with the established communication channel, wherein users subscribed to a communication channel "123" receive an emergency notification message published to the "1", "12", and "123" communication channels.

13. The method according to claim 12, wherein the notification application is configured to provide a law enforcement personnel immediate information on an exact location of the emergency.

* * * * *